(12) United States Patent
Collins

(10) Patent No.: US 6,695,547 B2
(45) Date of Patent: Feb. 24, 2004

(54) TIRE RASP BLADE AND ASSEMBLY

(75) Inventor: Anthony Collins, Belmont (AU)

(73) Assignee: B & J Manufacturing Company, Glenwood, IL (US)

(*) Notice: Subject to any disclaimer, the term of this patent is extended or adjusted under 35 U.S.C. 154(b) by 31 days.

(21) Appl. No.: 10/128,631

(22) Filed: Apr. 23, 2002

(65) Prior Publication Data

US 2002/0164216 A1 Nov. 7, 2002

(30) Foreign Application Priority Data

May 4, 2001 (AU) ............................................. PR4788

(51) Int. Cl.$^7$ ................................................. B23D 71/00
(52) U.S. Cl. .................................. 407/29.13; 407/29.11
(58) Field of Search .......................... 407/29.11, 29.12, 407/29.13, 29.14

(56) References Cited

U.S. PATENT DOCUMENTS 5,033,175 A    7/1991  Jensen
5,461,762 A   10/1995  Jensen
5,504,981 A    4/1996  Jensen
5,647,698 A  *  7/1997  Jensen ..................... 407/29.12

\* cited by examiner

*Primary Examiner*—Daniel W. Howell
*Assistant Examiner*—Brian D. Walsh
(74) *Attorney, Agent, or Firm*—Edwin D. Schindler

(57) ABSTRACT

A rasp blade 200 has cutting teeth 130, 132, 134, 136, 140 arranged along the outer perimeter of the blade and having a variable radius. The radius is raised for the teeth 130, 132, 134, 136 at either end of the blade. The radius is lower for the teeth 140 at the center of the blade 200. The radius variation is determined by the rasp blade cutting diameter and the angle that the blade 200 is to nest on the end plate of the hub assembly in which the blade is used. The blade may extend from 30° to 90° with the preferred sizes being 45° or 90°. At least three apertures 148 are provided in each blade to ensure that the failure of any one pin holding the blade in the hub assembly does not result in catastrophic damage to the hub assembly.

11 Claims, 5 Drawing Sheets

TIRE RASP BLADE AND ASSEMBLY

FIELD OF THE INVENTION

The present invention is in the field of tire retreading and relates to improvements in the apparatus used for the retreading of tires. In particular, the invention relates to rasp blades, and in an improved assembly of such blades on tire rasp hubs for buffing away the tread on worn tires.

BACKGROUND OF THE INVENTION

It is becoming increasingly accepted that the retreading of worn tires, also known as casings, contributes positively to both the economic and environmental well being of the community by providing reduced manufacturing and purchase costs and by preventing large numbers of worn tires from polluting and destroying the environment, whether as land fill or discarded otherwise. Also, as tires are petrochemically derived products, large reserves of oil and other energy forms are used in their manufacture, and the resultant polluting emittents are an undesirable by-product. It is generally not well known that most of a worn tire remains useful as the tire body or walls, comprising a significant major portion of the tire, are normally in excellent condition and have about the same strength as a comparable new tire.

The conventional process by which suitable worn tires, or casings, are retreaded is to buff away the worn tread, selectively repair any damage that may remain in the casing after buffing, bond the new tread to the casing by a selected vulcanizing process, cure the rubber so as to harden and shape it into the desired tread design, before final inspection for suitability for use.

In order to buff and cut away the worn tread, the casing is mounted on a buffing machine (or lathe type machine) and inflated. A tire buffing rasp hub, comprising a hub core having a large number of toothed rasp blades mounted thereon, is then rapidly rotated, say, on a motor driven shaft, and the peripheral surface of the casing is moved against the rotating rasp hub so as to loosen, tear and grind off the excess rubber and roughen it sufficiently so that the buffed surface of the casing can bond the new rubber tread in the vulcanizing process. Each tire has a predetermined crown width, profile and radius and the casing must be buffed to the particular shape, size and texture to receive a new tread that ensures optimal tread to road contact. Buffing of the worn tread is therefore a critically important stage of the retreading process.

Rasp blades of the prior art comprise numerous configurations and shapes, a particularly preferred type comprises teeth of an essentially dove tail shape projecting from the outer working edge of an arcuately shaped rasp blade, each of the teeth having a notch cut out from the most distant surface from the body of the blade to form a series of substantially 'Y' shaped teeth separated by recesses of partly incomplete circular shape. The notch formed in each tooth divides it into halves, and each half is offset to opposite sides of the general plane in which the blade lies, thus creating a second edge immediately behind the cutting edge of each tooth. As the rasp hub is rotated, the first or leading edge buffs or cuts the surface of the casing to a texture which markedly improves the bonding of new rubber thereto.

A typical tire buffing rasp hub which includes such rasp blades as aforementioned has the form of a hub core defined by interconnected front and back cylindrical end plates having mounted therebetween arcuate or quadrant shaped rasp blades stacked in four (or more) separate parallel arrays with a partly spiral inclination around the circumferential perimeter of the rasp core. Each rasp blade of any one stack is separated from its adjacent other blade of the stack by spacers, the stack being secured in position between the end plates by support pins through a hole or holes in each rasp blade. Removable fastening means hold the end plates together, sandwiching the rasp blades, thus allowing for dismantling of the rasp hub for purposes of maintenance and repair, such as when the teeth become worn or broken.

In the prior art, all blades of whatever configuration and shape used on tire rasp hubs were of identical shape, size and distribution of teeth for that particular tire rasp hub. For instance, any two adjacent blades in a stack had identical secondary and tertiary configuration and any one tooth of one blade was aligned substantially horizontally (or vertically depending on the set up of the buffing machine) with a tooth of the adjacent blade. This was usually facilitated by fixing each blade of a stack in a "name down" direction, whereby the manufacturer's name which appeared on only one of the two opposed faces of the blade indicated the direction to which the name side of all blades of that stack were to face. Where this technique was not employed, some other means of facilitating the stacking of the blades in a commonly aligned direction was used. Furthermore, all of the teeth on each blade were symmetrically disposed across the working edge of the blade. For instance, the tooth closest to one end was located the same distance from that end as the tooth closest to the other end was located from that other end.

It was found by the present inventor that by off-setting or indexing all of the teeth to one side of their position in prior art symmetrically disposed blades by a quarter of the pitch that separates each tooth in the blade, and by fixing each blade of a stack in a repeating "name up", "name down" direction, a superior and longer lasting buffing performance and buffed texture is achieved. The assembly of blades so formed presents one form of a staggered teeth array across each stack of the rasp hub. This arrangement was disclosed in Australian Petty Patent 719,185.

A hub is rotated at high speed anywhere from 1440 to 4,100 rpm or higher. The tire to be treated is also rotated but in an opposite sense to that of the hub. Two types of action are involved in removing the tread. The hub is advanced radially into the tread in a feed pattern and across the tread in a traverse pattern. The wear on blade teeth differs for each of these modes. In a feed pattern, wear is greatest in the middle rows of a hub while in a traverse pattern wear is more evident in the outer rows of the hub. In either pattern wear on a blade in a given row depends on the arrangement of the blades in the row. Where the angle of a blade with respect to the axis and direction of rotation of the hub is positive the blade is referred to as leading and most of the wear is borne by such blades. Moreover, most wear on an advancing blade occurs towards that end of the blade periphery first contacting the tire tread. Blades at a negative angle are called retreating or trailing blades and receive little effective wear. Reversing the rotation of the hub and/or tire changes trailing blades into advancing blades and wear over a hub's circumference can be made more uniform. This complicates the design and control of the buffing apparatus. In addition, the uneven wear on a blade tends to overheat that section of the blade affecting the quality of the buffing action by the blade by heating the tire rubber.

Thus it is found that a blade tends to wear over only a partial extent of the teeth. This is true also for other forms of prior art rasp blades. For example, in the prior art 4, 5 or 6 blades can circumscribe the hub axis. The wear of the teeth in a 4 bladed arrangement where the teeth are alternatively angled in a leading/trailing sequence only provides a 25% efficiency, that is, only a quarter of the teeth are buffing the tire tread. Obviously, wear dictates when the blade has to be replaced. In addition, friction between the blade teeth and the tire tread heats a blade in this area of disproportionate wear adding another factor to a reduced life for the blade than would otherwise be suggested. Thus considerable wastage occurs with this prior art arrangement.

Also, in the prior art one or two pins support each blade in a hub arrangement. The hub may rotate at a speed of 4,100 rpm or more and the centrifugal forces generated can result in bending, flexing and eventual breakage of a pin. If a blade is supported by a single pin, its breakage may fling the blade from the assembly and unbalance the hub. If a blade is supported by two pins and one breaks, the blade is retained by the second pin but the hub can still become unbalanced. This may cause damage to the hub, the tire or, if a blade is flung off, it may injure persons or property nearby.

SUMMARY OF THE INVENTION

The present invention seeks to provide a further improvement in the use of rasp blades and in particular the arrangement as described in Australian Petty Patent 719,185, by increasing the contact region of each rasp blade thereby providing more effective use of a blade and a more efficient buffing action.

It is therefore an object of the present invention to provide a rasp blade and hub assembly that can be used more efficiently.

It is another object of the present invention to provide an arrangement of blades on a tire rasp hub adapted to buff away worn tread from a casing at a rapid rate while developing a minimum amount of heat that might otherwise adversely affect the texture of the buffed surface needed for suitable retreading.

According to a first aspect of the present invention there is provided a rasp blade for buffing tire treads including an arcuate substantially planar base, a row of teeth along a working peripheral edge of said base and means for fixing said base into a hub assembly, wherein said arcuate base extends substantially not more than 45° and said row of teeth are in a substantially circular path.

According to a second aspect of the present invention there is provided a rasp blade for buffing tire treads including an arcuate substantially planar base, a row of teeth extending along a working peripheral edge from one end to another end of said base and means for fixing said base into a hub assembly, wherein said arcuate base extends substantially not more than 45° and said row of teeth extends along an arc having a variable radius from said one end thereof to said other end thereof, said radius being measured from the rotational axis of said hub assembly and said variable radius being greater at said ends and decreasing towards the center of the blade.

Preferably, said arcuate base and said row of teeth extend along an arc of between 30 and 45 degrees and said means for fixing are a plurality of apertures in said base for accommodating pins of said hub assembly therethrough.

A blade, according to the invention, which extends over an arc of 45° has a performance improvement of 50% over a similar prior art blade.

According to a third aspect of the present invention there is provided a rasp blade for buffing tire treads including an arcuate substantially planar base, a row of teeth along a working peripheral edge of said base and means for fixing said base into a hub assembly, wherein said row of teeth extends along an arc having a variable radius from one end thereof to the other, said radius being measured from the rotational axis of said hub assembly.

Preferably, said variable radius is larger at said ends and decreases towards the center of the blade.

According to a fourth aspect of the present invention there is provided a rasp blade for buffing tire treads including an arcuate substantially planar base, a row of teeth extending along a working peripheral edge from one end to another end of said base and means for fixing said base into a hub assembly, wherein said row of teeth extends along an arc having a variable radius from said one end thereof to said other end thereof, said radius being measured from the rotational axis of said hub assembly with which the rasp blade is used, said variable radius being greater at said ends and decreasing towards the center of the blade.

Preferably, said arcuate base and said row of teeth extend along an arc of between 30 and 90 degrees and said means for fixing are a plurality of apertures in said base for accommodating pins of said hub assembly therethrough.

The blades according to the invention are arranged into stacked rows about a hub Preferably, adjacent blades in a row are arranged in parallel or alternate leading/trailing orientations that is, the blades set alternately at a positive or negative angle to the axis of the hub, and/or with teeth in adjacent rows overlapping as described in Australian Petty Patent 719,185.

Preferably, each blade has three apertures for supporting or fixing the blade by pins into a hub arrangement or assembly.

BRIEF DESCRIPTION OF THE DRAWINGS

Preferred embodiments of the invention will now be described with respect to the following drawings in which.

DETAILED DESCRIPTION OF THE PREFERRED EMBODIMENTS

Figure 1:
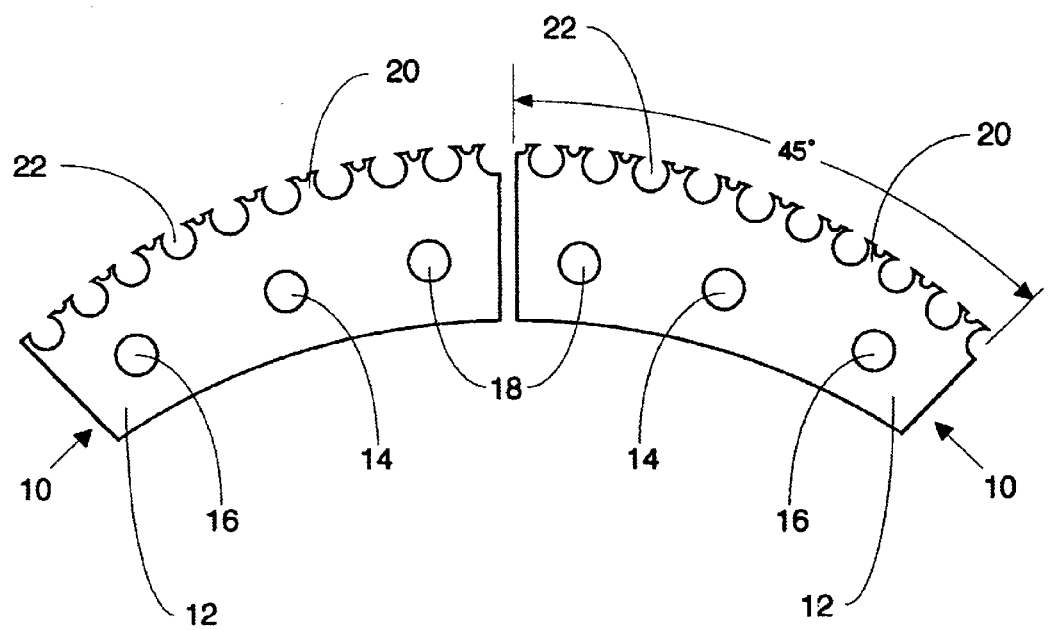
FIG. 1 shows a rasp blade according to a first aspect of the invention.

Referring to FIG. 1, a first embodiment of the invention is shown. A blade 10 of a generally arcuate shape extends over a 45° sweep. A planar base 12 has apertures 14, 16, 18 for fixing the blade onto the pins of a hub. Teeth 20 are arranged along the cutting edge 22 of the blade 10 and are of any form well known in the prior art, for example of a twisted crown shape or dove-tail configuration.

The blade 10 is stacked into a hub with eight blades 10 arranged in each row about the periphery of the hub and with each blade being affixed to the hub by rods or pins. As three apertures are provided for fixing each blade, breakage of any one pin does not substantially adversely affect the balance of the hub or the retention of the blade by the other two pins while the hub is rotating.

Figure 2:
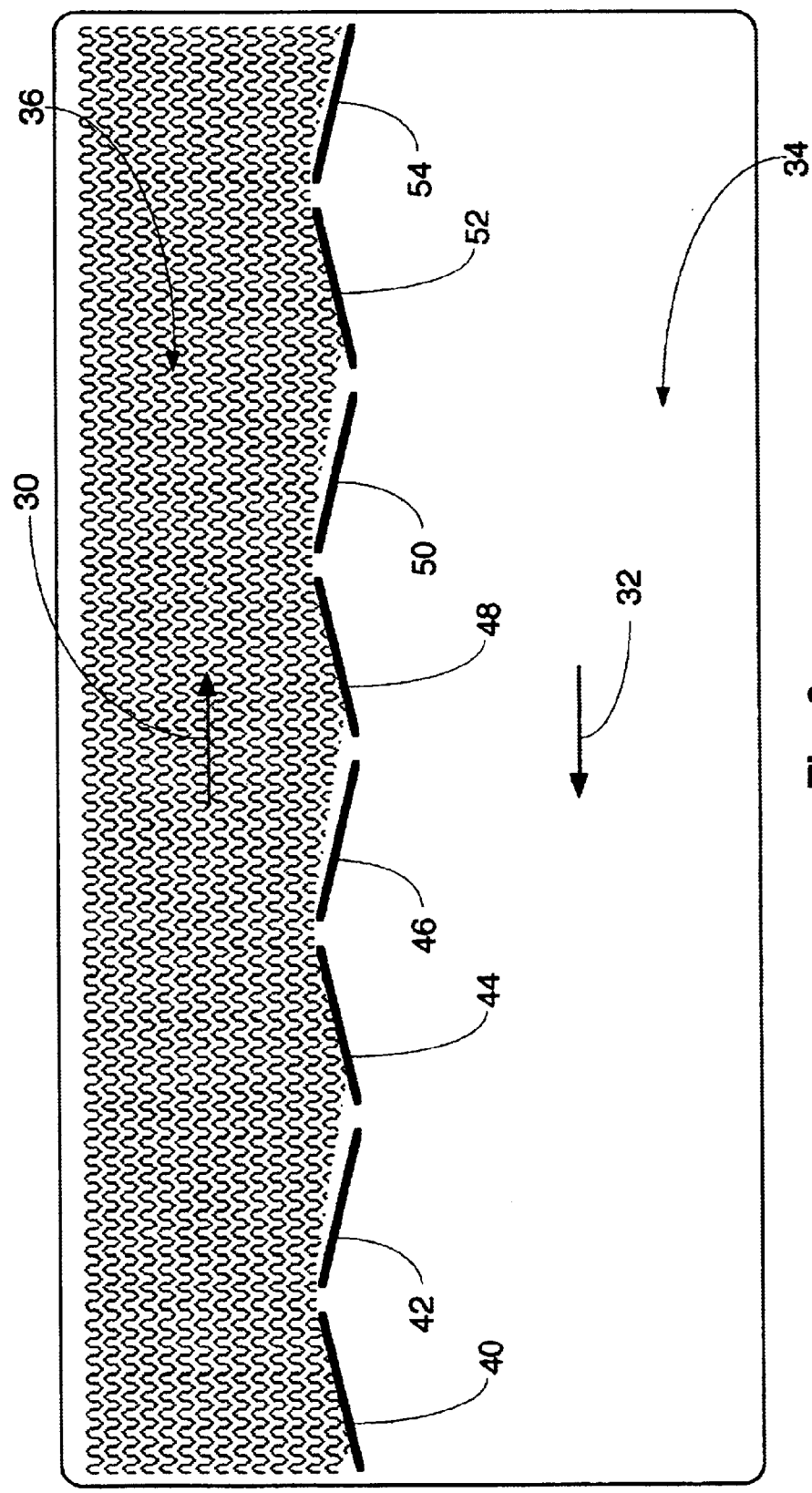
FIG. 2 shows a rasp blade according to a first aspect of the invention arranged into a row.

As shown in FIG. 2, this hub arrangement may be an alternate leading/trailing or mirrored arrangement in which adjacent blades are set at given alternate positive or negative angles with respect to the axis of the hub, each even or each odd blade thus being parallel.

FIG. 2 shows a schematic whereby the tire rotates in the direction of the arrow 30 and the hub, with blades according to the invention arranged in rows, rotates in the direction of the arrow 32. One row of blades only is shown. The smooth area 34 shows the area of the tire which has already been buffed whereas the area 36 shows the area of the tire still with tread. As the tire and the hub rotate, the blades 40, 44, 48, 52 are advancing into the tread area 36 and are cutting the tread. The blades 42, 46, 50, 54 are trailing and are not cutting the tread area 36. In this arrangement most of the effort and wear is being performed by the blades 40, 44, 48 and 52.

Figure 3:
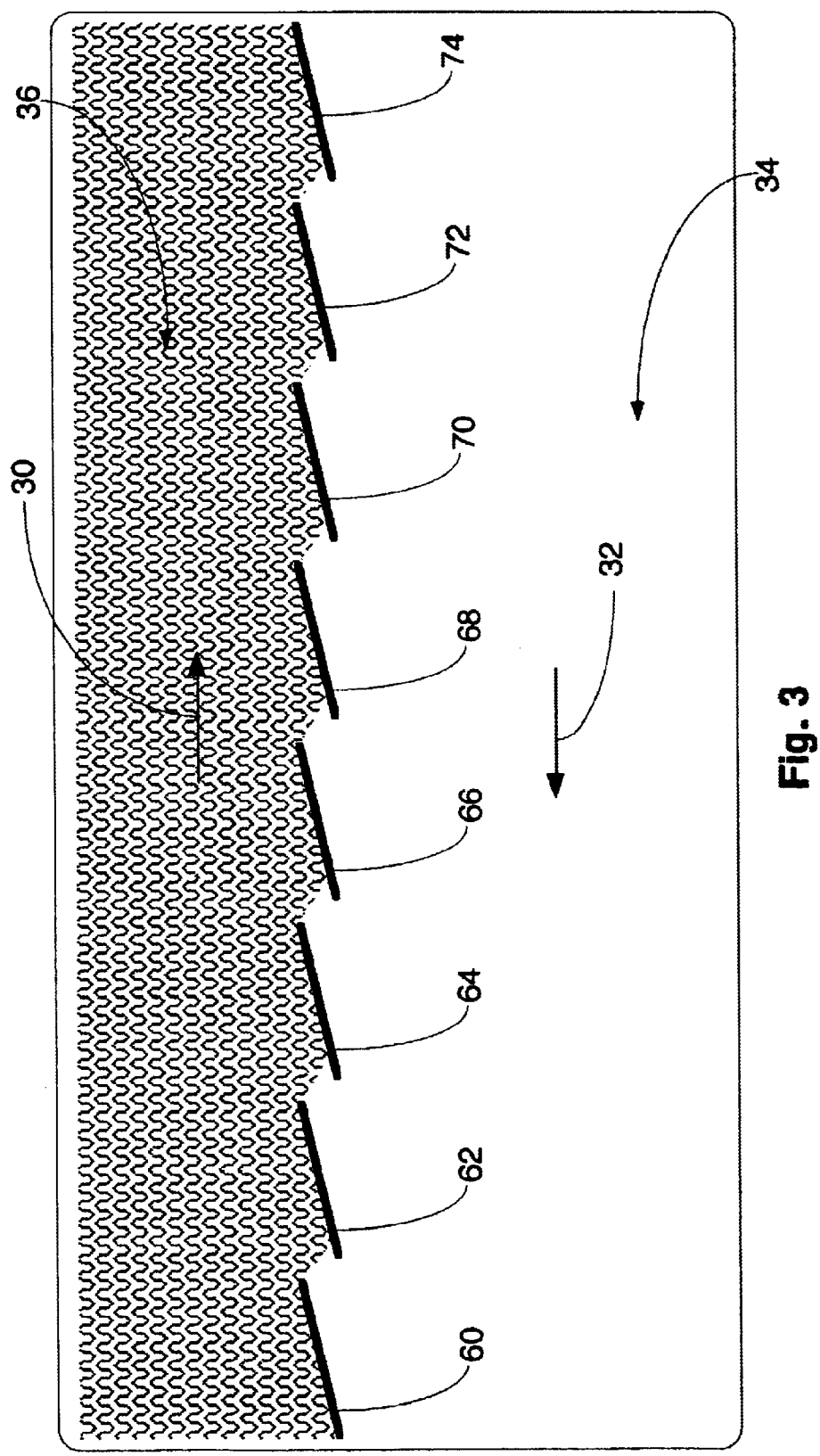
FIG. 3 shows a first embodiment of the invention arranged into a row of blades according to a second arrangement.

Referring to FIG. 3, which shows a second embodiment, the blades 60, 62, 64, 66, 68, 70, 72, 74, which each extend over a 45° arc, are each arranged at the same angle with respect to the axis of the hub and present a parallel array of blades in a row. The blades 60, 62, 64, 66, 68, 70, 72 and 74 are thus all advancing and effective as cutting blades along a row of the hub for a given direction of rotation of the hub. In this way 100% usage of each blade is made.

As each blade 40–54 or 60–74 is arranged separately of each other blade in a row and is set at an angle to the axis of the hub assembly, it extends axially over a shorter distance (than a prior art blade) and a row of blade teeth buffs a narrower swathe of tire tread. As a row of blades according to the invention has substantially the same number of teeth, of whatever shape, as a row of blades of a prior art construction the teeth thereof are providing both a more effective and a more rapid wear of the tire tread for a given rate of rotation of the hub. Moreover, the narrower width of a row of blades permits more rows of blades according to the invention, to be stacked into a hub for a given size (axial extent). For a given hub arrangement, the density of teeth over the surface area of the hub is increased.

FIGS. 2 and 3 only show a schematic of a single row of a hub whereas in practise a plurality of rows are arranged into a stack to form the hub. Blades in adjacent rows are normally parallel and arranged identically, that is, with the name stamp facing in the same direction. Alternatively, as described in Australian Petty Patent 719,185 the blades in adjacent rows may have adjacent blades reversed, that is with the name stamp facing forward in one row and facing backward in the next adjacent row, in this way providing an overlap of cutting teeth.

Figure 4A:
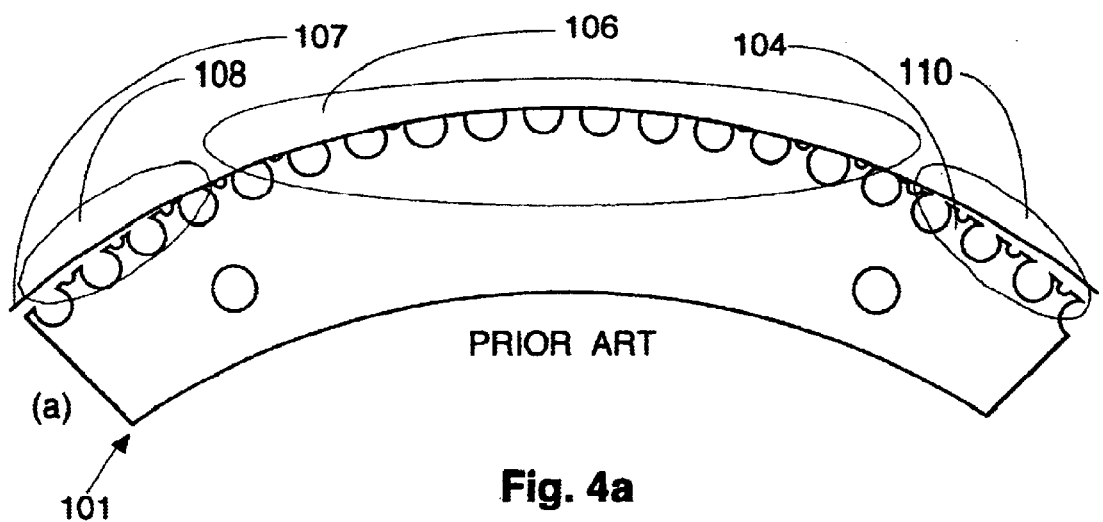
FIG. 4a shows an example of the prior art.
Figure 4B:
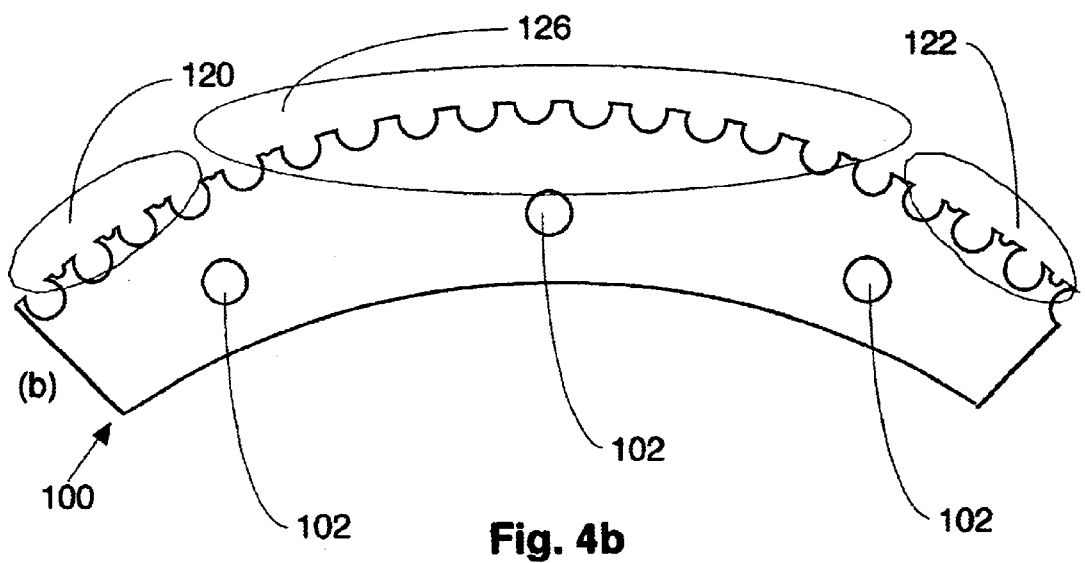
FIG. 4b shows a second embodiment of the invention.

Referring to FIGS. 4 and 5, another aspect of the invention is shown. FIGS. 4 and 5 show respectively two different embodiments of this aspect of the invention. Referring to FIG. 4(a), a prior art blade 101 is illustrated, in which the teeth 104, as discussed above, mostly contact the tire being buffed in the region 106 while the areas 108, 110 are left less used. For this prior art blade 101, the contact region 106 is shown by the contact line 107. FIG. 4(b) shows a blade according to the invention and is a standard four segment blade 100 which extends over an angular extent of approximately 90°. Apertures 102 are arranged at the center and at the sides of said blade for securing the blade through pins to a rasp hub. The blade 100 overcomes the disadvantage of the blade 101 by having the teeth 120, 122 at the outer edges of the blade 100 of an increased radius compared to that of the radius of the teeth in the central region 126 of the blade 100. In this way the teeth 120 and 122 equally contact the surface of the tire being buffed and contribute to the buffing effect of the blade 100 as do the teeth in the central region 126.

The radius variation between the outer teeth 120,122 and the central teeth of the region 126 is determined by the rasp blade cutting diameter and the angle that the blade is to nest on the hub's end plate. An incremental radius of 0.148 inches is effective for the teeth in the regions 120,122 for a blade extending over an arc of 90 degrees, of radius 4.5 inches, as measured for the teeth in the central region 126 of the blade 100, and wherein the pins through the apertures 102 are located on a pitch circle diameter of 7.624 inches.

Figure 5A:
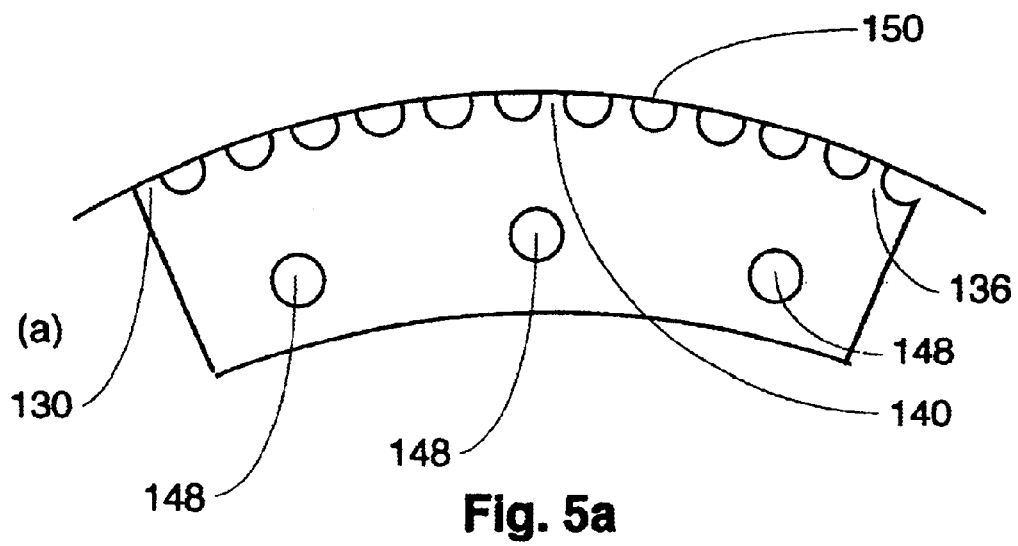
FIGS. 5a and 5b show a second embodiment of the invention with the blades arranged according to a second arrangement.
Figure 5B:
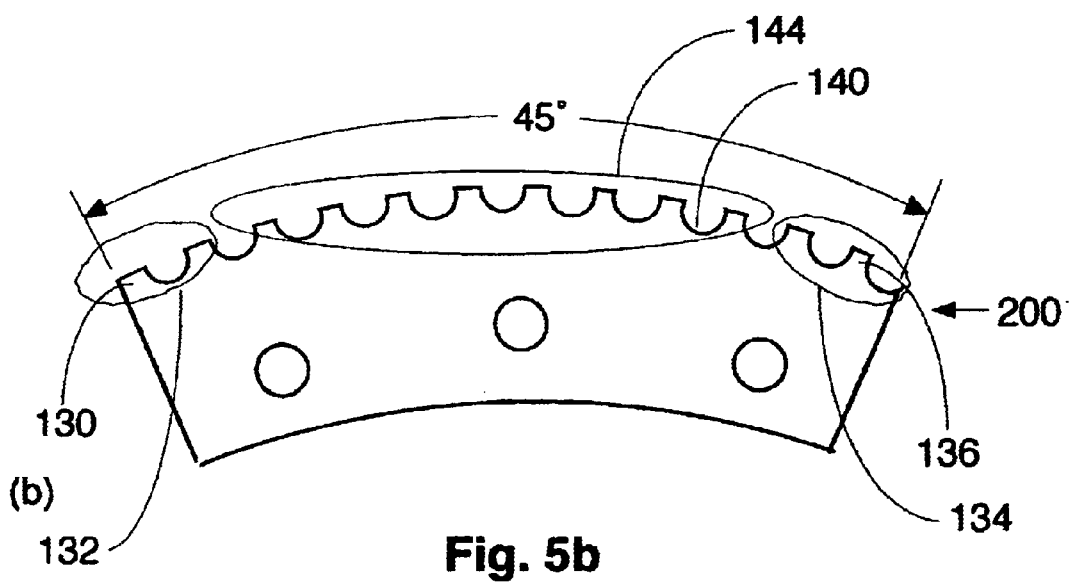

A further improvement in this aspect of the invention can be made by making the blade of a shorter angular extent for example as shown with respect to FIG. 1 above wherein the blade extends approximately 45°. This embodiment is shown in FIGS. 5(a) and 5(b). The blade 200 has the outermost teeth 130, 132, 134, 136 of a slightly increased radius compared to the radius of the teeth 140 in the central region 144 of the blade. In this arrangement, all teeth of the blade are making contact with the tire tread, as described above with respect to FIG. 1, 2 or 3, and contribute to the buffing action provided thereby, as illustrated by the contact line 150 in FIG. 5(a). The blade 200 has three apertures 148 arranged at the center and at the sides of said blade for securing the blade through pins to a rasp hub.

Further embodiments of the invention as described with respect to any one of FIG. 1, 2, 3, 4 or 5 include having the blade extend over an arc of 36° or 30°, that is, a row is made up of 10 or 12 blades respectively rather than 8 with consequent improved performance.

Although the invention has been described above with respect to preferred embodiments thereof other variations are contemplated with the knowledge of a person skilled in the art. For example, while a certain type of tooth has been shown in the drawings and described in this specification other forms of teeth are contemplated as useable with the blades according to the invention. Blades, according to the invention, can be made in the usual manner by a metal stamping or moulding process and of materials within the knowledge of a person skilled in the art.

I claim:

1. A rasp blade for buffing tire treads including an arcuate substantially planar base, a row of teeth extending along a working peripheral edge from one end to another end of said base and means for fixing said base into a rasp blade hub assembly, wherein said arcuate base extends substantially not more than 45° and said row of teeth extends along an arc having a variable radius from said one end thereof to said other end thereof, said radius being measured from the rotational axis of said hub assembly and said variable radius being greater at said ends and decreasing towards the center of the blade.

2. A rasp blade for buffing tire treads as claimed in claim 1 wherein said row of teeth extends along an arc of between 30° and 45°.

3. A rasp blade for buffing tire treads as claimed in claim 2 wherein said means for fixing are a plurality of apertures in said base for accommodating therethrough pins of said hub assembly in which said rasp blade is to be used.

4. A rasp blade for buffing tire treads as claimed in claim 3 wherein said plurality of apertures includes three apertures in said arcuate substantially planar base.

5. A rasp blade for buffing tire treads as claimed in claim 1 wherein said variation is determined by the rasp blade cutting diameter and the angle that the blade is to nest on an end plate of said rasp blade hub assembly.

6. A rasp blade for buffing tire treads including an arcuate substantially planar base, a row of teeth extending along a working peripheral edge from one end to another end of said base and means for fixing said base into a rasp blade hub assembly, wherein said row of teeth extends along an arc having a variable radius from said one end thereof to said other end thereof, said radius being measured from the rotational axis of said hub assembly with which the rasp blade is used, said variable radius being greater at said ends and decreasing towards the center of the blade.

7. A rasp blade for buffing tire treads as claimed in claim 6 wherein said arcuate base extends substantially not more than 90°.

8. A rasp blade for buffing tire treads as claimed in claim 7 wherein said arcuate base extends substantially between 60° and 90°.

9. A rasp blade for buffing tire treads as claimed in claim 6, wherein said radius variation is determined by the rasp blade cutting diameter and the angle that the blade is to nest on an end plate of said hub assembly with which the rasp blade is to be used.

10. A rasp blade as claimed in claim 7 wherein said radius variation is 0.148", said blade extends over an arc of 90° and said radius from said rotational axis of said hub assembly is 4.5".

11. A rasp blade as claimed in claim 9 wherein said radius variation is 0.148", said blade extends over an arc of 90° and said radius from said rotational axis of said hub assembly is 4.5".

* * * * *